United States Patent [19]

Mosbacher

[11] Patent Number: 5,108,005

[45] Date of Patent: Apr. 28, 1992

[54] METHOD AND APPARATUS FOR AUTOMATICALLY DISPENSING ITEMS FROM SHELVES

[75] Inventor: Anton Mosbacher, Graz, Austria

[73] Assignee: Knapp Logistik Automation Gesellschaft M.B.H., Austria

[21] Appl. No.: 577,493

[22] Filed: Sep. 4, 1990

[30] Foreign Application Priority Data

Sep. 6, 1989 [DE] Fed. Rep. of Germany ....... 3929656

[51] Int. Cl.⁵ .................................................. G07F 11/10
[52] U.S. Cl. ........................................... 221/1; 221/93; 221/94; 221/193; 221/DIG. 1; 414/278
[58] Field of Search ................. 221/DIG. 1, 1, 92, 93, 221/94, 123, 192, 193, 194, 195, 253, 13; 198/359, 360; 414/273, 278

[56] References Cited

U.S. PATENT DOCUMENTS

| | | | |
|---|---|---|---|
| 1,439,550 | 12/1922 | Hunter et al. | 221/93 |
| 1,717,926 | 6/1929 | Horowitz | 221/253 X |
| 3,079,964 | 3/1963 | Oldershaw | 221/253 X |
| 4,267,942 | 5/1981 | Wick, Jr. et al. | 221/92 X |
| 4,355,733 | 10/1982 | Schoenkopf et al. | 221/123 |
| 4,501,528 | 2/1985 | Knapp | 221/93 X |

FOREIGN PATENT DOCUMENTS 0069984 1/1983 European Pat. Off. .

Primary Examiner—Robert P. Olszewski
Assistant Examiner—Dean A. Reichard
Attorney, Agent, or Firm—Steinberg & Raskin

[57] ABSTRACT

A method for automatically dispensing items from shelves includes the steps of orienting magazines for a particular type of item horizontally in multi-tier shelves in such a way that removal openings in the respective bottom side face walls of the item type magazines are horizontally aligned, assigning to each magazine tier at least one item pusher, simultaneously removing from the respective tiers the items belonging to a particular requisition order, collecting them in a collecting device, depositing them on or in a conveying device, and transporting them to merchandise delivery sites. The apparatus for facilitating use of the method includes a multi-tier shelf with item type magazines on each tier, an item pusher on each tier, and a conveyor for conveying the items removed from the magazines to transport apparatus.

27 Claims, 7 Drawing Sheets

METHOD AND APPARATUS FOR AUTOMATICALLY DISPENSING ITEMS FROM SHELVES

BACKGROUND OF THE INVENTION

The invention relates to a method for storing many types of items such as piece goods on and for automatically dispensing them from shelves in large warehouses in which a particular type of item is placed into a correspondingly sized magazine and stacked therein wherein the interior bottom surface area of the correspondingly sized magazine corresponds to the greatest external surface area of the items stacked therein, the sized magazines are placed on shelves, with the aid of remote controlled pushers items are removed from the magazines, the items needed to fill a particular requisition order are guided to a coded container, and after loading the container is automatically conveyed under computer control to a merchandise delivery station.

The invention relates further to computer controlled apparatus for carrying out this method with at least one computer controlling remotely settable ejectors for removing the piece goods from the magazines and conveyor means such as conveyor belts or containers carried on conveyor belts to which the piece goods are transferred.

The growing variety of goods offered on the markets of western industrialized nations, in particular the pharmaceutical wholesale market, which often must deliver several thousand different articles in an extremely short time, makes indispensable conveying methods for requisitioning stored goods and for preparing the goods for mailing.

The automatic removal of items from warehouses is described in U.S. Pat. No. 3,881,633 in which items are stored in horizontal magazines. In order to remove the items from the magazines a slider movable via chain drives over the entire length of the magazine pushes against the stack of pieces so that the frontmost item(s) fall over the front magazine edge onto a conveyor belt running underneath the magazines. This apparatus however makes it difficult to load shelves and is extremely expensive with respect to the construction of the sliders.

In a further embodiment of the heretofore listed U.S. Pat. No. 3,881,633 a separate gripper is suggested which passes along the row of magazines, reaches into the magazines, and lifts a number of pieces over the front edge of the magazine and transfers them to conveyor means. The number of pieces is designated by a computer. The conveyor means subsequently transfers the batch belonging to the particular order into transport containers.

In DE 32 13 119 A1 a method and an apparatus for the storing and for the automatic removal of items is described in which an order to combine several different items in extremely short time can be completed without interrupting the process of restocking the magazines. Therein, the different types of items are filled into correspondingly sized magazines which on shelves are combined into blocks. Through remote-controlled delivery units the individual item types are removed from the magazines, collected when the transport container arrives at the preceding block, and subsequently placed simultaneously into a transport container when the latter arrives at that particular block. After loading, the transport container is moved further wherein the speed of the transport containers is maximized to minimize removal, collection, and loading time so that the whole process is completed in minimum time. To reduce time it is in particular suggested for the removal of several items of one type to load several magazines with the same type of item and to take one item from each of the magazines sequentially. It is also possible to carry the removed items simultaneously from several points within the block to one single collecting point with the collecting point, this point disposed preferably in the center of the block and the pieces being conveyed to the collecting point if necessary in opposite directions from the beginning and from the end of the block. This, procedure can be carried out with an arrangement in which the shelves are divided into blocks with each block having several shelf bottoms and item type magazines fastened thereon. The shelf bottoms are inclined with respect to the vertical. The item type magazines have at their lower ends delivery units which transfer the item to conveyor means. The apparatus as well as the conveyor means are controlled by a computer system. These methods or apparatuses however are oriented toward ordering of products required frequently and in large numbers of items. On the pharmaceutical wholesale market for example 40 to 50% of the sales are made with only about 2,000 products. The known apparatuses are conceived primarily for the ordering of these products. However, approximately 5,000 to 10,000 pharmaceutical products comprise approximately an additional 30% of the total pharmaceutical sales. With respect to these products pharmaceutical wholesale businesses therefore are confronted with the problem of handling the multiplicity of products with respect to storage and requisitioning. Thus, 5,000 to 10,000 item types need to be accessible at any time in as small a space as possible without the logistical expenditures becoming immense.

Known apparatuses in which each item type magazine has its own ejector are unsuitable here because of the large number of ejectors which would be required in this case.

SUMMARY OF THE INVENTION

It is therefore an object of the present invention to describe a method and apparatus with which the storage and dispensing of a large variety of items from shelves is made possible in minimal space, with low technical complexity, and in minimal time, and wherein the magazines or blocks are rapidly loadable so that the removal of items is interrupted either not at all or only very briefly.

This object is achieved with a method which comprises orienting the magazines for items of a particular type horizontally in multi-tier shelves in such a way that the removal openings in the respective bottom side walls of the item type magazines are horizontally aligned, assigning to each magazine tier at least one item pusher, simultaneously removing from the respective tiers the items belonging to a particular requisition order collecting them in a collecting device, depositing them on or in a conveying device, and transporting them to merchandise delivery sites.

Other preferred embodiments of the method are explained hereinafter.

The above object is also achieved through an apparatus which comprises a multi-tier shelf with item type magazines on each tier, at least one item pusher on each tier, and conveying means conveying the items removed from the magazines in the magazine tiers to transport means.

The invention has the advantage that a multiplicity of item types can be stored in an extremely small space on several tiers and removed simultaneously from several tiers. With a single pusher freely movable along a magazine tier a very large number of item type magazines can be serviced. By eliminating the need for a pusher integrated into each item type magazine the cost of the magazines is greatly reduced. The item boxes of one type stacked in an uprightly aligned item type magazine slide downward in the shaft-like magazine after the removal of the lowest box. Therefore only one pusher is required which engages the bottom opening of a magazine and pushes out the lowest item of a stack in the horizontal direction.

The inventive apparatus comprises an especially thin movable pusher with the object of keeping the vertical distance between the item type magazine tiers very small which, in turn, has the advantage that many tiers can be disposed one above the other. Yet the magazines are readily loadable from above because they can be tilted backward for the purpose of loading such that their upper ends are freely accessible. Within a particular tier the item type magazines can be disposed side wall adjacent to side wall so that a further optimization of space utilization is achieved.

The problem of filling a requisition order as rapidly as possible with an extremely large variety of item types is solved according to the invention wherein the item type magazines of all tiers of a multi-tier shelf are vertically aligned and a collecting vehicle extending in the vertical direction over all tiers is movable along the front of the shelves together with associated pushers. The collecting vehicle moves horizontally and removes with its associated pushers simultaneously on all tiers the items belonging to one order. In the narrow shaft-like collecting vehicle is disposed a slide leading downward for the items. The collecting vehicle can be closed at its lower end by a remotely controllable flap which is opened after all pieces belonging to a particular order and reachable from the collecting vehicle have been collected. A conveyor belt is generally located under the collecting vehicle. The collected items can therefore be deposited either directly on the conveyor belt or be placed into a coded transport container which is transported by the conveyor belt. All operations are coordinated and optimized with respect to time by computer control.

The multiplicity of the item type magazines which are simultaneously approachable can be increased by disposing the front sides of two multi-tier shelves opposite to each other at such a distance that a collecting vehicle can simultaneously service the two opposing fronts of the two shelves.

The exact positioning of the pushers is achieved preferably through a marking at the magazines for example through electromagnetically activated positioning pins. The coupling between collecting vehicle and pusher can be established with customary mechanical or electrical means. For example carrying hooks fastened on the frame of the collecting vehicle can engage a guide shoe of the pusher. The pushers are precisely guided underneath the magazine blocks and upon activation, preferably with the aid of a toothed belt, push the lowest package of a magazine directly into the collecting vehicle.

A further embodiment of the method according to the invention is advantageous when handling orders for large numbers of items of one type as well as a multiplicity of item types. Large numbers of items of one type require large magazines. In the method according to the invention this means that the magazines are long because in an item type magazine according to the invention items of one type are stacked such that only one package forms the bottom layer of the stack. The need for an increased multiplicity of items with simultaneously a lower number of items per type permits the use of shorter item type magazines. Short magazines can be disposed in a multi-tier arrangement as described above.

In the previously discussed embodiment of the method according to the invention which permits requisitioning large numbers of items with increased item type multiplicity a single tier arrangement of long magazines is combined with a two to three tier arrangement of short magazines. The rows of magazines are advantageously arranged like a gabled roof wherein the long magazines form one side of the gabled roof and the short magazines arranged in the form of two to three tiers form the other side of the gabled roof. The pushers operate in the direction of the "attic" where conveyor means, for example a transport belt, are located.

Inclined metal slide sheets ensure that the items removed from higher tiers reach the transport belt without free falling. With this embodiment conventional type magazines can be used with an integrated pusher as well as the item type magazines without pushers described heretofore which are serviced by a freely movable pusher. Here too numerous item type magazines can be combined to form a block serviced by one pusher.

BRIEF DESCRIPTION OF THE DRAWINGS

The method according to the invention and the arrangements according to the invention are explained hereinafter in conjunction with preferred embodiment examples illustrated by the Figures. As shown therein:

FIG. 1 shows an elevational view of a multi-tier magazine arrangement on two opposing shelves with a collecting vehicle disposed in between;

PREFERRED EMBODIMENTS OF THE INVENTION

The automatic control and completion of a requisition order according to the method and apparatus of the present example is detailed for example in DE 32 13 119 A1.

Figure 1:
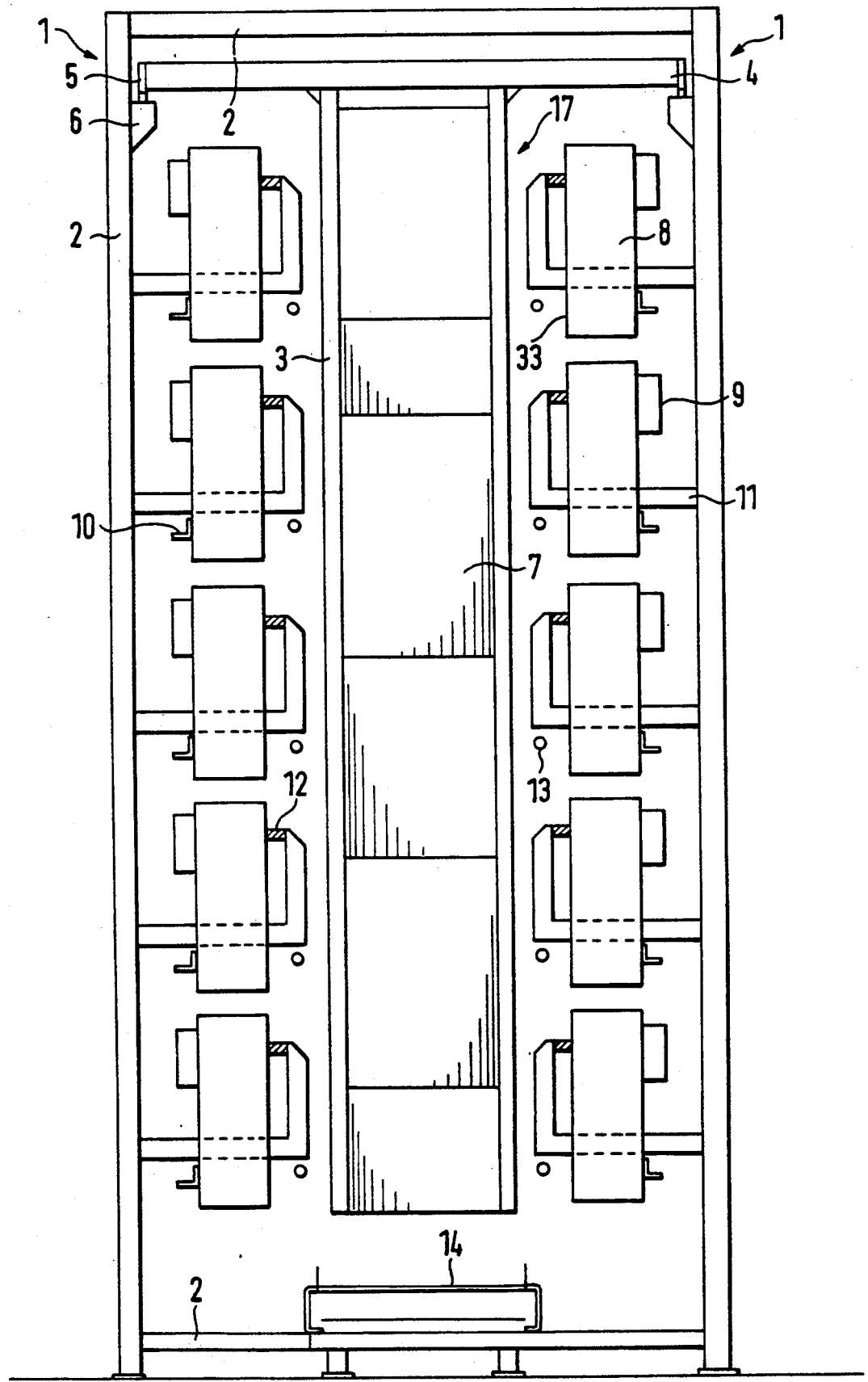

A preferred embodiment of the multi-tier arrangement of item type magazines according to the invention is represented in FIG. 1. Two multi-tier shelves 1 are here combined in one structure with a frame 2. Integral to this structure is the collecting vehicle 17. It extends vertically over all tiers and horizontally over the width of at least one item type magazine and preferably over the width of several item type magazines. The two shelves 1 are oriented in parallel horizontally as well as vertically. They are oriented opposite each other; front side against front side, and the front sides are at such a distance that the collecting vehicle 17 fits precisely between the shelf fronts and actuation devices for the pushers are horizontally freely movable. The collecting vehicle 17 shown in FIG. 1 hangs from an undercarriage 4 whose rollers 5 engage runner rails 6 fastened at the upper end of the shelf frame 2 on the shelf carriers. This hanging disposition has the advantage that a relatively great inherent stability of the collecting vehicle can be achieved without great constructional expenditure using lightweight materials. Precise orientation and positioning is simpler since it must take place by taking account of the effect of gravity. In the lower region of the shelf where the item delivery from the collecting vehicle takes place, optimum freedom and clarity of view is given. A transport belt 14 is disposed underneath the lower end of the collecting vehicle 17 on which belt either transport containers for receiving the collected items are carried or the collected items are deposited directly on the belt. This transport belt 14 of course communicates with other conveying devices in the requisition facility to which the shelf unit of FIG. 1 belongs. In the collecting vehicle 17 is disposed a slide 7 for the items taken from the item type magazines 8 on the different tiers. In the embodiment shown in FIG. 1 the slide comprises inclined slide sheets which in a zig-zag course lead from tier to tier. In the embodiment shown the plane of the slide surfaces faces the viewer. Overall the slide sheets are disposed so that the input of items into the collecting vehicle can take place on each tier from right and left, which means from both opposing shelves. In the embodiment shown in FIG. 1 consequently removal can take place from at least ten magazines simultaneously.

In the embodiment shown the item type magazines 8 stand with their longitudinal axes substantially vertical and in vertically and horizontally aligned arrangement. The item removal openings are located in each instance in the face or front side of the item type magazine 8 facing the collecting vehicle 17, preferably at its lower end. The positioning and fastening of the magazines on the shelf is achieved in very simple manner in the represented embodiment. A horizontal carrier rail 10 is provided onto which the magazines 8 are placed with a plug connection located on the lower part of its rear wall. Another horizontal rail 12 disposed horizontally and vertically offset relative to the carrier rail 10 supports the item type magazine 8 in the upper region of its front side toward the front side. This rail 12 can have a pure stopping function. In this case the fastening of the magazines 8 comprises a three point support. On a handle 9 located on the rear wall of the magazine 8 which also has the plug connection the magazine can be removed by tilting it backwardly over the carrier rail 10.

As shown in FIG. 1 the carrier rail 10 can be fastened on the horizontal shank of a carrier arm 11 anchored in the shelf frame. The stop rail 12 can be fastened on a vertical shank of the same carrier arm 11. Preferably the slide rail 13 for the pusher (not shown in FIG. 1) is located at the front side end of the horizontal portion of carrier arm 11 and extends parallel to the carrier rail 10 and the stop rail 12.

Figure 2:
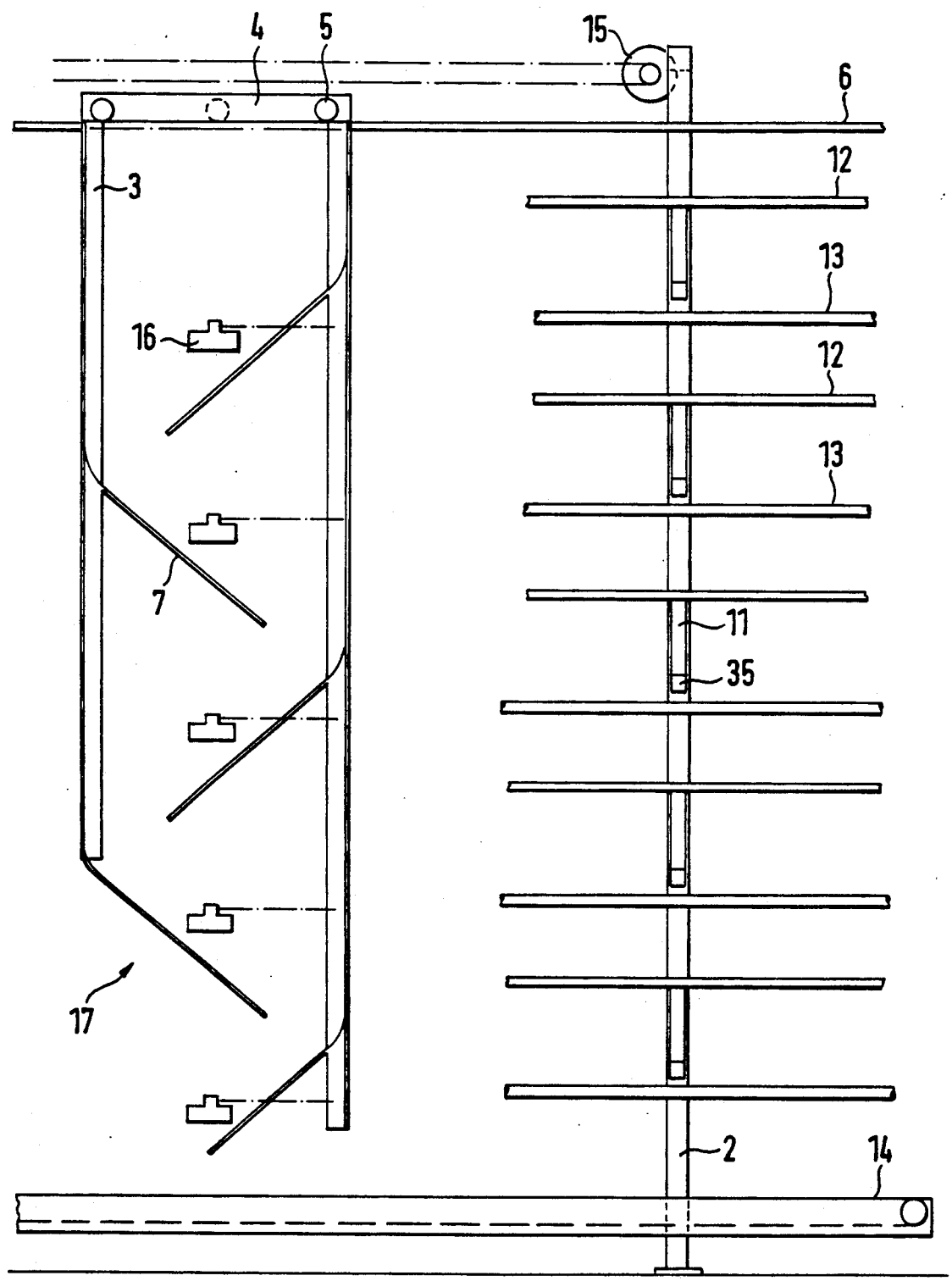
FIG. 2 shows a partial front view of a shelf half of FIG. 1 (without item type magazine) in a plane perpendicular to the plane represented in FIG. 1 and next to it a longitudinal section through the collecting vehicle in a plane parallel to the described plane.

In FIG. 2 are represented in front view one of the shelf sides shown in FIG. 1, the rails already described, and the arrangement of the collecting vehicle 17 on the shelf. At the upper end of the shelf frame 2 is disposed the runner rail 6 for the rollers 5 of the undercarriage 4 of the collecting vehicle 17. A drive 15, for example an endless belt or chain drive, engages the undercarriage 4 of the collecting vehicle 17 and ensures precise horizontal displacement. For each magazine tier are represented one horizontal stop rail 12 and one slide rail 13 each. The carrier rail 10 in this embodiment is covered by the slide rail 13 located in front of it and therefore is not shown in the drawing. The vertical shank of the carrier arm 11 and the front profile of its horizontal portion characterized by the reference number 35 are shown in the drawing. In the bottom area the transport belt 14 is also indicated. In the collecting vehicle 17 represented next to it the arrangement of the slide sheets 7 is more clearly recognizable than in FIG. 1. The plane of FIG. 2 is perpendicular to the plane of FIG. 1. Consequently it becomes clear that the plane of the slide sheet 7 is parallel to the direction of the input of the item. This ensures an unhindered item input from the two opposing front sides of the shelf. The item arrives through the inlet openings 16 in the collecting vehicle 17. In the embodiment shown in FIG. 2 the collecting vehicle 17 has only one inlet opening 16 for each magazine tier. It is understood, however, that several inlet openings for each tier can be provided.

Figure 3:
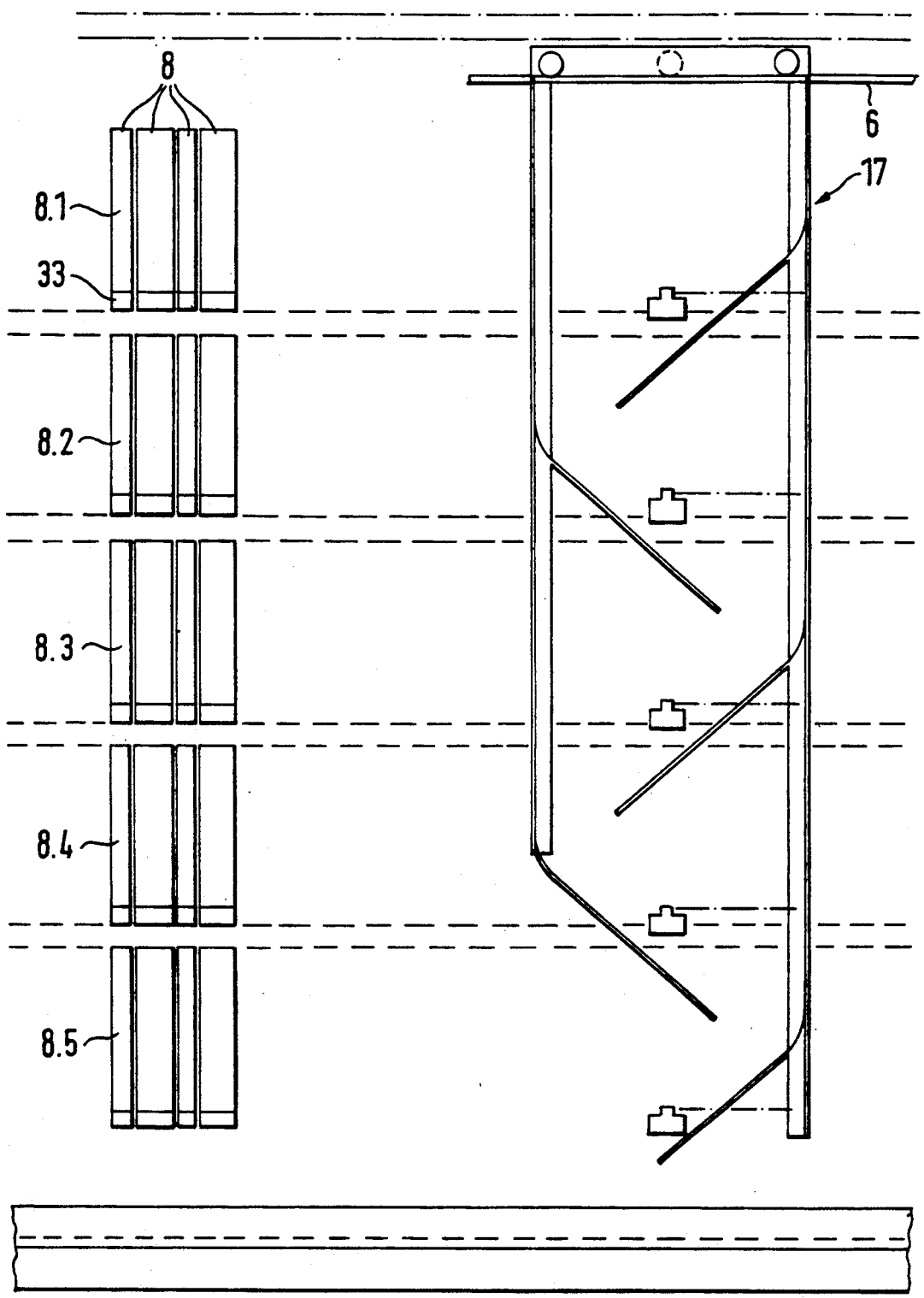
FIG. 3 shows a front view of a schematic representation of a multi-tier magazine arrangement according to FIG. 1 and next to it a longitudinal section through the collecting vehicle in the plane represented in FIG. 2.

FIG. 3 shows a schematic representation of any given magazine arrangement on shelf 1 of FIG. 1 and in relation to the collecting vehicle 17. This Figure is a front view of a shelf half of FIG. 1, wherein the collecting vehicle 17 is shown in longitudinal section as in FIG. 2. The plane of the drawing consequently is the same as in FIG. 2. The schematic arrangement of the item type magazine 8 shown in the left portion of FIG. 3 shows its horizontally and vertically aligned arrangement. This aligned arrangement can be limited to the position of the delivery openings 33, that is, the magazines can also be inclined in one plane or in two planes. As long as the delivery openings 33 are vertically and horizontally aligned they can all be serviced by a single collecting vehicle 17 and one or several pushers slideable for each tier (not shown in FIG. 3). In the embodiment represented in FIG. 3 the removal of the item from the removal openings 33 takes place perpendicularly to the plane shown in the drawing.

Figure 4:
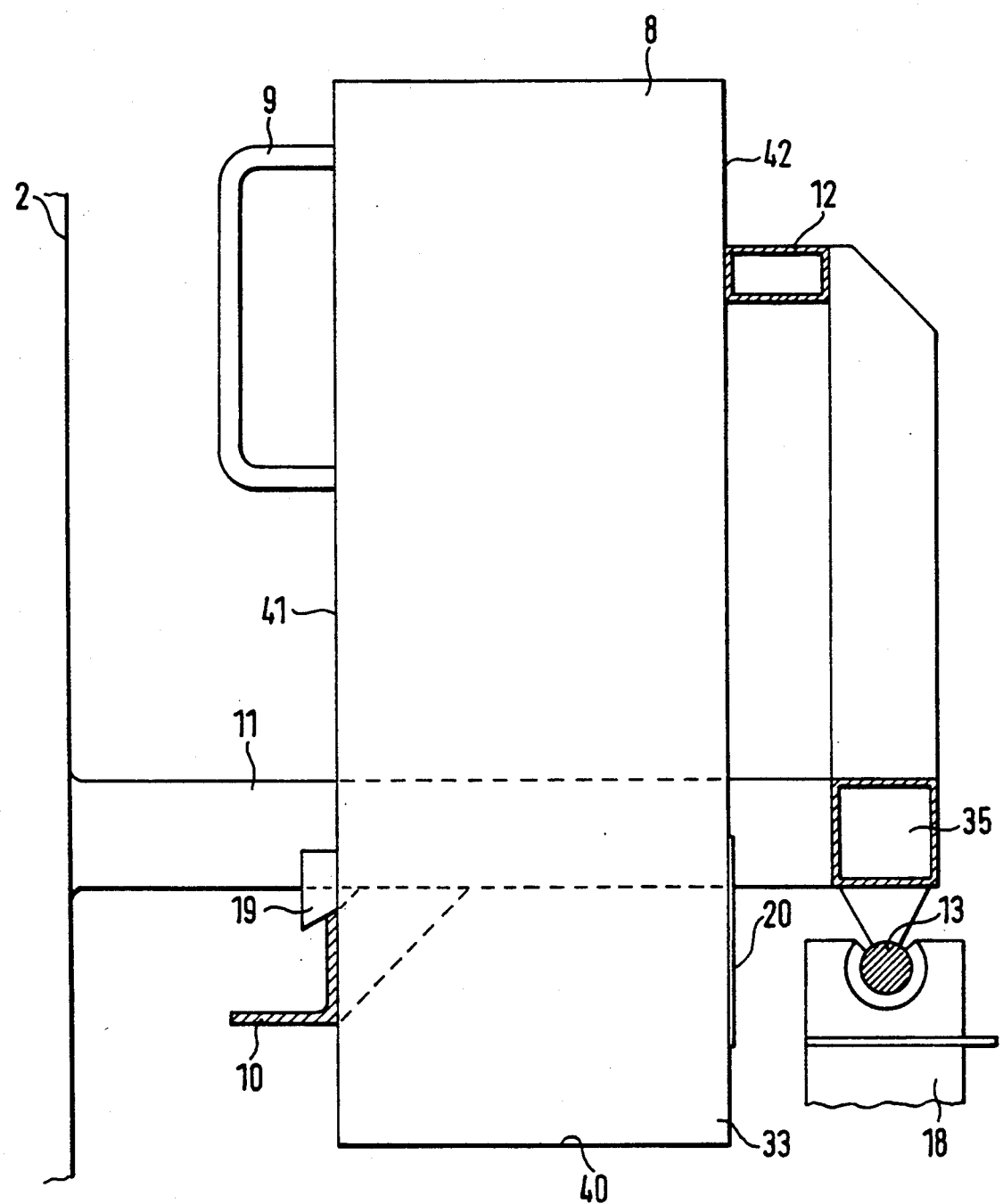
FIG. 4 shows a side view of an item type magazine in its position on a shelf.

FIG. 4 shows an item type magazine 8 in greater detail as well as its fastening on the shelf. On its back side are disposed a handle 9 and below it a fastening device 19. The fastening device can comprise two fastening hooks disposed next to one another at the same level or it can comprise a shell type shoe. Therewith the magazine 8 is placed or plugged onto the carrier rail 10. The fastening device 19 is in any case of such a type that the magazine 8 can be disposed and positioned on the rail 10 in the longitudinal direction of the rail and also be lifted off vertically from the rail. However, it is not horizontally displaceable perpendicularly to the longitudinal direction of the rail. The item type magazine 8 is braced above with its front side 42 thereof against the stop rail 12. Directly above the bottom 40 of the item type magazine 8 is disposed on the front side 42 the item removal opening 33. Above it is located a slide 20 with which the vertical height of the opening 33 can be set depending on the size of the item packages stacked in the magazine such that only the lowest package can be pushed out horizontally. In the embodiment shown the carrier rail 10 is fastened on a carrier arm 11 which is fastened in turn on the shelf frame 2. The horizontal shank of the carrier arm 11 projects only so far beyond the front side 42 of the item type magazine 8 that a vertical shank integral with the horizontal shank is fastenable at its upper end with the stop rail 12 and is fastenable at its lower end with slide rail 13.

The item type magazines 8 of one tier are preferably of identical length; however they can readily be different widths and depths. With different widths care must be taken that in one vertical shelf plane magazines of identical width are disposed one above the other. In the case of different depths the depth differences are compensated for with the fastening device 19 so that the removal openings on the front sides 42 of the magazines are vertically and horizontally aligned.

Figure 5:
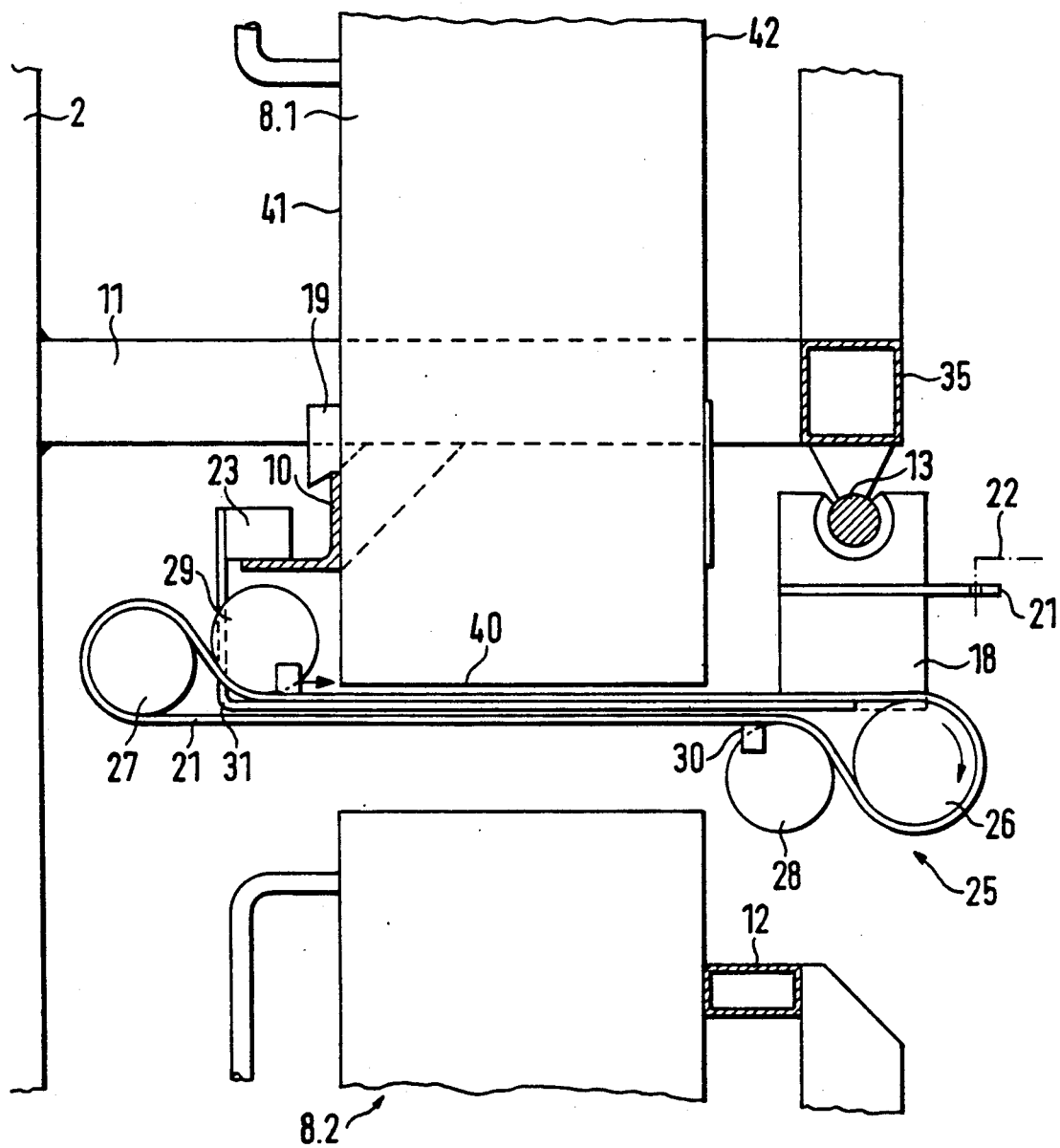
FIG. 5 shows a side view of a pusher in its position between two magazine tiers on a shelf.

FIG. 5 shows the arrangement of a toothed belt pusher or ejector 25 between two magazine tiers 8.1 and 8.2. The flat construction of this pusher according to the invention is readily visible therein. Directly underneath bottom 40 of the item type magazine 8.1 extends a toothed belt 24 running as an endless belt over front and rear deflection rollers 26 and 27. The toothed belt 24 extends horizontally essentially in the space between the magazine carrier rail 10 and the slide rail 13, and also perpendicularly to these two rails. In the region between magazine tiers 8.1 and 8.2 the height of this ejector decreases whereby the belt is compressed in the vertical direction by pressing rollers 28 and 29. For this purpose the pressing rollers 28 and 29 are respectively disposed behind the front and rear deflection rollers 26 and 27 and operate opposingly. In other words the one pressing roller 29 is disposed on the top side and the oppositely acting pressing roller 28 on the underside of the belt. The running surfaces of the deflection rollers are recessed in the middle so that the tooth or the teeth of the belt 24 do not disturb the circulation of the belt. The belt 24 has at least one tooth 30 which engages a slit in the bottom 40 of the magazine 8 extending from the rear side 41 to the front side 42 in the bottom 40 of the magazine 8. Preferably the belt 24 has two teeth 30 at equal distance from its center. The aforementioned roller and toothed belt arrangement is fastened on a carrier 31 displaceably fastened on the shelf front with the aid of a slide shoe 18 on the slide rail 13 and behind magazines 8 on the carrier rail 10 in the direction of extent of the rails. In the embodiment represented in FIG. 5 a roller 23 fastened on carrier 31 engages the rail 10 on the rear side of magazine 8. In this manner precise guidance and secure horizontal displaceability of the pusher 25 is achieved. On the slide shoe 18 devices are provided with which the pusher 25 can be detachably connected with the collecting vehicle. For example in FIG. 5 a finger 21 is shown which a hook 22 coming from the collecting vehicle 17 engages. In every case the pusher 25 has devices which permit the synchronous movement of pusher and collecting vehicle.

It should however be emphasized that the pusher 25 can also be fastened directly on the collecting vehicle 17. In the case of direct fastening a guide element in slide rail 13 can be omitted. It is then possible to also omit the guide element on the rail 10 on the rear side of the magazine.

Figure 6:
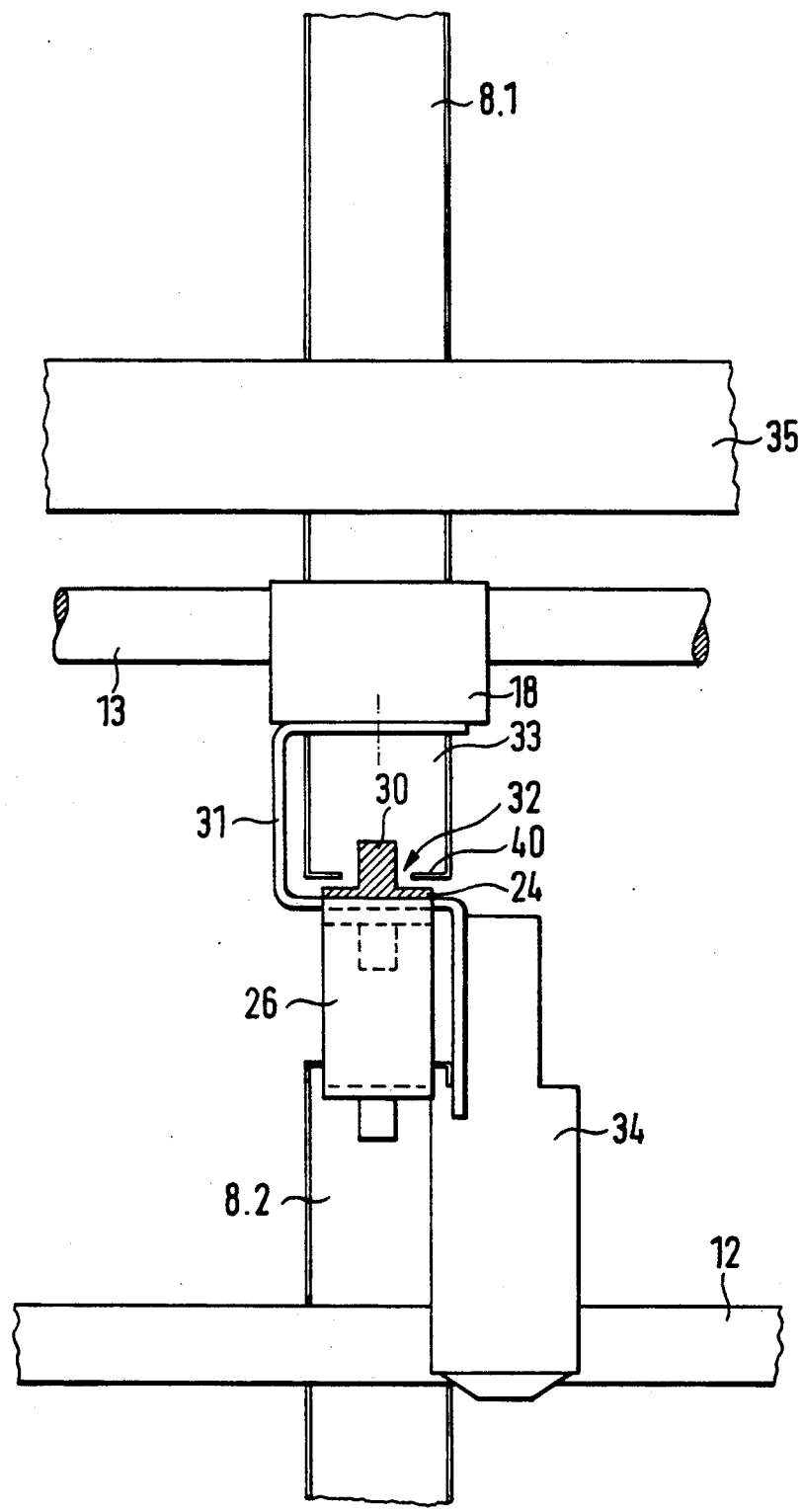
FIG. 6 shows a front view of the arrangement shown in FIG. 5 (in a plane perpendicular to the plane shown in FIG. 5)

FIG. 6 shows a front view of the subject matter of FIG. 5. In this way it becomes clearer how the toothed belt 24 engages with tooth 30 a slit 32 in the magazine bottom 40 during the pushing out of the item. This Figure also shows how small the distance between the magazine tiers 8.1 and 8.2 can be if the toothed belt 2 is compressed in the vertical direction with the aid of the pressing rollers 28 and 29 shown in FIG. 5 in the region between the magazines of two adjacent tiers. In the embodiment of FIG. 6 the carrier 31 is a metal sheet which has a flange under the slide shoe 18 and which also carries the drive motor 34 for the pusher. The slide rail 13 can also be fastened on a rail 35 extending parallel to it which can be connected, in turn, with the carrier arm 11.

Figure 7:
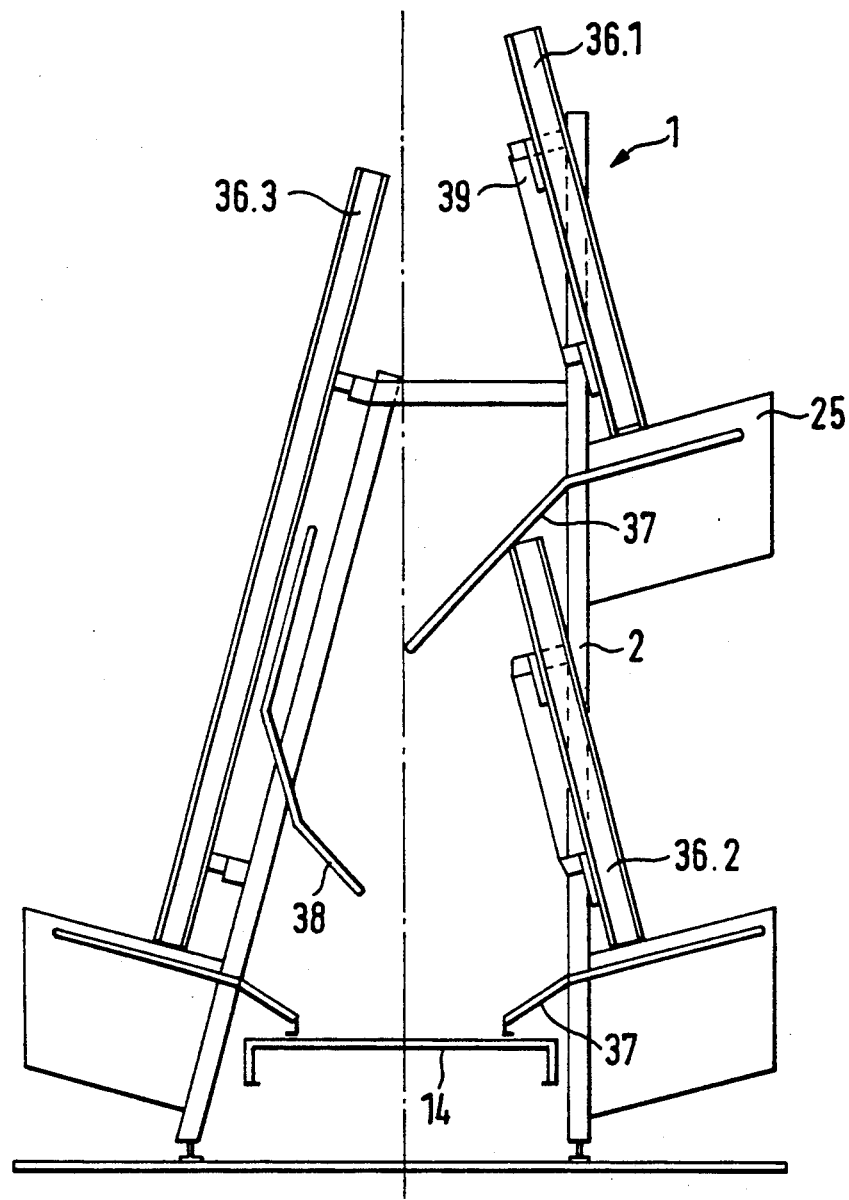
FIG. 7 shows a view of a gabled roof embodiment of an arrangement according to the invention.

FIG. 7 shows another embodiment of a multi-tier shelf. In this embodiment a two tier magazine arrangement 36.1, 36.2 is combined with a conventional single tier magazine arrangement 36.3. The single tier magazines 36.3 are significantly longer than the magazines 36.1 and 36.2 disposed in two tiers one above the other. In the long magazines those items are accommodated which are required in greater numbers. The magazines can for example be 1.5 to 3 meters long. They comprise preferably rails with a U-shaped profile, wherein the open ends of the U are bent inwardly. In this manner a viewing gap extending over the entire magazine is created, thus facilitating the monitoring of the degree of filling. The magazines are fed from above. At the lower end they have pushers 25. These can be known pushers or the toothed belt pushers described hereinbefore. In the embodiment shown in FIG. 7 the pusher 25 can also be disposed to be horizontally movable in order to serve a greater number of magazines of one tier. In the represented embodiment the shelf frame has approximately the shape of an unsymmetrical "A" with one inclined and one vertical shank. On the inclined shank are fastened the long magazines 36.3 in one tier. On the vertical shank shorter magazines 36.1 and 36.2 and associated guide sheets 37 are disposed in two tiers. All magazines of one tier are disposed so as to be parallel and spatially inclined. The spatial incline is implemented therein in that the long magazines 36.3 of the one tier arrangement and that the short magazines 36.1 and 36.2 of the two tier arrangement have at their upper filling ends a lesser distance from each other than at the base where the removal takes place. In this way a gabled roof-like arrangement is obtained. Therein the item type magazines of one tier can also be inclined in the roof plane. The delivery of the item takes place in the "attic" direction, that is in the space enclosed by the gabled roof areas. Guide and reflection sheets 37 or 38 guide the removed item so that it is deposited approximately in the center of the attic on conveyor means, for example on a conveyor belt 14, disposed there.

What is claimed is:

1. A method for dispensing items from shelves, said method comprising the steps of;
   stacking items of particular types into respective item type magazines;
   placing filled item type magazines on a first multi-tier shelf such that removal openings in respective bottom side walls of the respective item type magazines of a single tier are horizontally aligned;

providing a collecting vehicle extending in a vertical direction over all tiers which is movable along the front of the shelves, utilizing at least one mechanical pusher for each tier to push items required by a particular requisition order from said item type magazines into said collecting vehicle; and transferring said items from said collecting vehicle to a conveyer means.

2. The method of claim 1 wherein said removal openings are vertically aligned such that said required items from a single vertical row are removed simultaneously.

3. The method of claim 1, further comprising placing filled item type magazines on a second multi-tier, shelf said second multi-tier shelf being oriented such that removal openings in respective bottom side walls of item type magazines thereon are aligned vertically and horizontally with and spaced apart from said removal openings of said first multi-tier shelf such that respective said removal openings of said first multi-tier shelf and respective said removal openings of said second multi-tier shelf face each other, and utilizing said collection vehicle to simultaneously collect items required by a particular requisition order from said first multi-tier shelf and said second multi-tier shelf.

4. The method of claim 2, further comprising placing filled item type magazines on a second multi-tier shelf, said second multi-tier shelf being oriented such that removal openings in respective bottom side walls of item type magazines thereon are aligned vertically and horizontally with and spaced apart from said removal openings of said first multi-tier shelf such that respective said removal openings of said first multi-tier shelf and respective said removal openings of said second multi-tier shelf face each other, and utilizing said collection vehicle to simultaneously collect items required by a particular requisition order from said first multi-tier shelf and said second multi-tier shelf.

5. The method of claim 1, further comprising linking together said collector vehicle and said at least one mechanical pusher for each tier to move together from one said removal opening to another.

6. An apparatus for dispensing items from shelves comprising:

a multi-tier shelf;

a plurality of respective item type magazines, each magazine holding a particular type of item, mounted on each tier of said multi-tier shelf;

a collecting vehicle extending in a vertical direction over all tiers which is movable along a front of the shelves;

at least one mechanical pusher mounted on each tier of said multi-tier shelf for pushing items needed to fill a particular requisition order from said item type magazines into said collecting vehicle; and conveyor means for receiving items from said collecting vehicle.

7. The apparatus of claim 6, wherein said conveyor means comprises an endless belt.

8. The apparatus of claim 6, wherein said conveyor means comprises an endless belt and at least one container thereon, said container functioning to receive items from said collecting vehicle.

9. The apparatus of claim 6, wherein said pushers are remotely actuatable by a computer.

10. The apparatus of claim 6, wherein said item type magazines each have a length greater than their respective width and depth and each is mounted on said multi-tier shelf such that its longitudinal axis is substantially vertical; and each said item type magazine has a removal opening in a bottom side wall thereof with the removal openings of said item magazines on each tier of said multi-tier shelf being horizontally aligned, and each said at least one mechanical pusher is horizontally movable to a position adjacent to each said removal opening of the item type magazines of a single tier.

11. The apparatus of claim 6, wherein said collecting vehicle is horizontally movable, has a vertical extent greater than said multi-tier shelf and is detachably connected to said mechanical pushers.

12. The apparatus of claim 6, wherein said multi-tier shelf comprises on each tier a horizontal slide rail on which said mechanical pushers can move, a horizontal carrier rail on which said item type magazines are mounted, and a horizontal stop rail for positioning said item type magazines on said carrier rail.

13. The apparatus of claim 12, wherein said multi-tier shelf comprises a frame and a plurality of carrier arms fastened to said frame member, each of said carrier arms having a horizontal shank and a vertical shank, said horizontal shank connected to said frame, said horizontal carrier rail, and said horizontal slide rail, and said vertical shank connected to said horizontal stop rail.

14. The apparatus of claim 12, wherein each said item type magazine is mounted such that its longitudinal axis is substantially vertical, and said horizontal carrier rail is disposed on one side of each said item type magazine, and said horizontal stop rail and said horizontal slide rail are disposed on an opposite side of each said item type magazine.

15. The apparatus of claim 12, wherein each said item type magazine has fastening means for detachable connection to one of said carrier rails.

16. The apparatus of claim 11, wherein said collecting vehicle comprises a slide extending from the level of the top tier of said multi-tier shelf at least to the level of the bottom tier of said multi-tier shelf and functioning to transfer items from said item type magazines to said conveyor means.

17. The apparatus of claim 16, wherein said slide comprises a plurality of slide sheets, each said slide sheet being inclined relative to the vertical plane and each said slide sheet being mounted in said collecting vehicle adjacent a respective tier of said multi-tier shelf with its lower end extending freely in the interior space of said collecting vehicle.

18. The apparatus of claim 11, further comprising drive means connected to said collecting vehicle and said collecting vehicle further comprising at its upper end an undercarriage with rollers and said multi-tier shelf further comprising a rail attached to its front such that said rollers move along said rail when said drive means moves said collecting vehicle horizontally.

19. The apparatus of claim 10, wherein said collecting vehicle has a plurality of respective openings in its outside surface at the level of said removal openings of said item type magazines for each tier of said multi-tier shelf.

20. The apparatus of claim 12, further comprising a plurality of slide shoes, each said slide shoes connecting one of said mechanical pushers to one of said horizontal slide rails, said slide shoe being provided with means detachably connecting said mechanical pusher to said collecting vehicle, so as to allow said one mechanical pusher and said collecting vehicle to move together along the front of said multi-tier shelf.

21. The apparatus of claim 20, wherein said mechanical pusher comprises an endless belt having at least one tooth integral thereto and each said item type magazine has a slit in its bottom and said apparatus further comprising a front deflection roller, and a rear deflection roller mounted on each of said item type magazines for guiding said pusher to move such that said tooth engages said slot.

22. The apparatus of claim 21, further comprising one front pressing roller and one rear pressing roller mounted on each of said item type magazines such that said endless belt of said pusher is compressed in the vertical direction therebetween.

23. The apparatus of claim 6, further comprising another multi-tier shelf, said another multi-tier shelf having a plurality of said item type magazines and a plurality of said mechanical pushers mounted thereon and being disposed parallel with and spaced from said multi-tier shelf such that said collecting vehicle is movable between said multi-tier shelf and said another multi-tier shelf to receive items needed to fill a particular requisition order from both shelves simultaneously.

24. An apparatus for dispensing items from shelves comprising:
 a single tier shelf containing one or more item type magazines oriented in parallel with each other along said single tier:
 a multi-tier shelf containing one or more item type magazines oriented in parallel with each other along each tier;
 said single tier shelf and said multi-tier shelf being oriented such that removal openings from their respective item type magazines are inclined toward a common vertical plane, with the item type magazine from said single tier shelf being substantially longer than the item type magazines of said multi-tier shelf such that they can accommodate item types in greater numbers than said item type magazines of said multi-tier shelf;
 said apparatus further comprising a mechanical pusher located on and horizontally movable across the bottom of each tier of said single tier shelf and said multi-tier shelf;
 and conveyor means located at the bottom of said apparatus between said single tier shelf and said multi-tier shelf.

25. The apparatus of claim 24, further comprising a slide sheet attached to and inclined downward from each said removal opening to facilitate items being removed from said item type magazines by said mechanical pushers and deposited on said conveyor means.

26. The apparatus of claim 25, further comprising a deflection sheet attached to and leading downward from a bottom edge of at least some of said slide sheets, said deflection sheet having a lesser angle relative to the horizontal plane than its slide sheet.

27. The apparatus of claim 24, wherein said multi-tier shelf is substantially vertical and said single tier shelf is inclined inward from the vertical plane such that at its top it is closer to said multi-tier shelf than at its bottom.

* * * * *